(12) United States Patent
Graux et al.

(10) Patent No.: US 8,394,874 B2
(45) Date of Patent: Mar. 12, 2013

(54) METHOD AND AQUEOUS ADHESIVE COMPOSITION FOR THE PRODUCTION OF PANELS MADE FROM VEGETABLE MATTER

(75) Inventors: Jean-Pierre Graux, Lillers (FR); Léon Mentink, Roubaix (FR)

(73) Assignee: Roquette Freres, Lestrem (FR)

( * ) Notice: Subject to any disclaimer, the term of this patent is extended or adjusted under 35 U.S.C. 154(b) by 1350 days.

(21) Appl. No.: 10/543,258

(22) PCT Filed: Jan. 20, 2004

(86) PCT No.: PCT/FR2004/000120
§ 371 (c)(1),
(2), (4) Date: Jul. 25, 2005

(87) PCT Pub. No.: WO2004/074380
PCT Pub. Date: Sep. 2, 2004

(65) Prior Publication Data
US 2006/0128840 A1    Jun. 15, 2006

(30) Foreign Application Priority Data
Jan. 24, 2003    (FR) ...................................... 03 00822

(51) Int. Cl.
*B29C 47/00*    (2006.01)
*C08L 3/00*    (2006.01)
*C08L 89/00*    (2006.01)
*D21H 19/54*    (2006.01)

(52) U.S. Cl. .......................................... 524/13; 524/47
(58) Field of Classification Search ................ 524/9, 47, 524/13
See application file for complete search history.

(56) References Cited

U.S. PATENT DOCUMENTS

| | | | |
|---|---|---|---|
| 1,883,617 A * | 10/1932 | Williams et al. ............... 156/283 |
| 3,444,109 A * | 5/1969 | Stephan et al. ................ 527/205 |
| 4,155,884 A * | 5/1979 | Hughes ........................... 527/309 |
| 4,397,756 A | 8/1983 | Lehmann |
| 4,587,332 A * | 5/1986 | Lane et al. ...................... 536/102 |
| 4,801,631 A | 1/1989 | Sachs et al. |
| 4,942,191 A | 7/1990 | Rogers |
| 4,992,519 A | 2/1991 | Mukherjee |
| 5,247,066 A | 9/1993 | Schoenberg et al. |
| 5,364,471 A * | 11/1994 | Czuchajowska et al. ....... 127/65 |
| 5,393,336 A * | 2/1995 | Foran et al. ................. 106/208.1 |
| 5,405,437 A * | 4/1995 | Leake et al. ................. 106/217.9 |
| 5,454,863 A * | 10/1995 | Foran et al. ................. 106/206.1 |
| 5,641,349 A * | 6/1997 | Koubek et al. ............. 106/206.1 |
| 5,696,186 A * | 12/1997 | Videau ............................. 524/48 |
| 5,895,804 A * | 4/1999 | Lee et al. ....................... 525/54.3 |
| 6,406,530 B1* | 6/2002 | Bengs et al. ................. 106/137.1 |
| 6,494,991 B1* | 12/2002 | Palmer et al. ............... 162/181.6 |
| 6,765,044 B1* | 7/2004 | Quantz ............................ 524/47 |
| 7,045,201 B2* | 5/2006 | Corvasce et al. ........... 428/296.4 |
| 7,163,579 B2* | 1/2007 | Muvundamina .......... 106/205.31 |
| 7,264,666 B2* | 9/2007 | Peltonen et al. ............ 106/207.1 |
| 2003/0194471 A1* | 10/2003 | Bengs et al. .................. 426/106 |
| 2004/0192811 A1* | 9/2004 | Skuratowicz .................... 524/47 |
| 2004/0221336 A1* | 11/2004 | Kossmann et al. ............ 800/284 |
| 2006/0113028 A1* | 6/2006 | Gombert ........................ 156/210 |
| 2006/0251914 A1* | 11/2006 | Hilken et al. ............... 428/537.7 |
| 2007/0066817 A1* | 3/2007 | Mentink et al. ................ 536/102 |

FOREIGN PATENT DOCUMENTS

| | | |
|---|---|---|
| CA | 1 225 763 A | 8/1987 |
| JP | 48-048532 A | 7/1973 |
| JP | 63-145385 A | 6/1988 |
| JP | 6-136334 A | 5/1994 |

* cited by examiner

*Primary Examiner* — Liam Heincer
(74) *Attorney, Agent, or Firm* — Young & Thompson

(57) ABSTRACT

An adhesive composition, includes at least one vegetable starch the amylose content of which is between 30 and 60%. The invention further relates to the method for using the composition, including application thereof to lignocellulose materials, the forming of a panel and the hot pressing thereof. The emissions of formaldehyde vapor during the method are as low as possible. The invention further relates to the panels produced as above and in particular the panels emitting reduced amounts of formaldehyde into the atmosphere.

21 Claims, No Drawings

METHOD AND AQUEOUS ADHESIVE COMPOSITION FOR THE PRODUCTION OF PANELS MADE FROM VEGETABLE MATTER

The present invention relates to a novel adhesive composition that is useful for manufacturing panels made of plant materials, especially lignocellulosic materials, that makes it possible to produce them with greatly or extremely reduced formaldehyde vapor emissions, in particular during a hot press phase.

For the purposes of the invention, the expression "panels made of plant materials" is intended to mean panels derived from wood, i.e. the various plywood panels, panels made of particles, of fibers, referred to as "sandwich" panels, of lamellae (OSB), of Isorel® type, reconstituted beams, referred to as "laminated wood", and also "box compartment" beams, that combine elements of the same nature or of different natures, for example wood and metal.

The present invention also relates to a method for manufacturing panels made of plant materials, especially lignocellulosic materials, in particular chipwood or plywood panels, comprising, for agglomeration, assembly, complexing or curing, a step of treating said plant materials with the novel adhesive composition according to the invention, and steps of forming and hot pressing.

In the context of the method, the reactions relating to agglomeration, assembly, complexing or curing are essentially brought about when hot pressing is being carried out.

The invention relates more particularly to a method, comprising a hot pressing phase, during which the formaldehyde vapor emissions are greatly or extremely reduced.

The invention also relates, by extension, to the bonding of various veneer, carpentry or joinery, products, or to the bonding of partitions, obtained according to similar principles also making use of synthetic resins, in particular aminoplast or phenoplast resins.

The invention also relates to the bonding of articles originating from cellulose-derived products, such as nitrocelluloses, ethylcelluloses, and cellulose acetates, propionates and acetobutyrates, the uses of which fall more within the province of plastics.

The invention is also directed toward compositions that are useful for agglomeration, curing, assembly or complexing methods or processes and that only make use of small, or even extremely small, amounts of synthetic resins, in particular formaldehyde-based resins.

Finally, the invention is directed, through the use of the novel composition according to the invention, toward novel panels made of plant materials, especially lignocellulosic materials, that are themselves more environmentally friendly and more friendly to public health, in particular by virtue of the greatly, or extremely, reduced formaldehyde vapor emissions during the manufacture, storage, installation and/or use of said panels.

For the purposes of the invention, the term "lignocellulosic material" describes any plant material comprising essentially cellulose, hemicelluloses, lignin and/or pentosans.

This definition concerns in particular all materials derived from wood, and also various materials derived, for example, from cotton, jute, hemp, ramie, sisal, flax or maize crops or other cereal crops.

A large variety of materials are thus available, that differ through their origin, their composition or their physical appearance, having in particular the appearance of powders, of fibrous masses, of particles, of pieces, of shavings or of lamellae.

For the purposes of the invention, the term "plant materials" is also intended to mean various materials, in particular starchy materials, capable of being involved significantly in the development of flat panels, as is described, for example, in International patent application WO 95/15894, or of "sandwich" panels as described in European patent EP 0 781 199.

In the current state of the art, aminoplast and phenoplast resins are widely used for the formulation of adhesive compositions. They make it possible to achieve, in the context of, the methods concerned, the best main physical properties, such as consistency, porosity, density, solidity, flexibility, water resistance or moisture resistance, or specific properties such as phonic or thermal insulating properties.

By way of example, mention may be made, in this context, of the "Novopan" patents, i.e. in particular French patents FR 2 069 609 and 610 or FR 2 111 367.

The increased, or even bulk, use of these formaldehyde-based resins, such as for instance urea-formol, phenol-formol, ketone-formol, melamine-formol, melamine-urea-formol, nitroparaffin-formol or tannin-formol resins, or of resins based on formaldehyde-releasing products, such as hexamethylenetetramine, poses acute problems as a result of their often high content of free formaldehyde.

Formaldehyde vapors irritate the skin and the mucous membranes, even at low amounts in the air (1 or 2 parts per million, or ppm), have an unpleasant odor from 0.2 ppm, and are reputed to affect respiratory functions ("formaldehyde asthma").

They affect first and foremost the concerned personnel involved in the manufacture of the panels made of plant materials and, although the packagings warn the user as to the irritant nature and the harmfulness by contact, permanent exposure remains the case.

This situation does not go down well with public opinion or the authorities responsible for public health. They insist upon powerful ventilation of the premises and frequent medical visits.

The panels produced are also the subject of a classification related to the emissions engendered:

| Class | Amount (in mg) of formaldehyde emitted per 100 g of panel | Amount (in ppm) of formaldehyde emitted into the air |
| --- | --- | --- |
| E 1 | less than 10 | less than 0.1 |
| E 2 | between 10 and 30 | less than 1 |
| E 3 | | less than 2.3 |

These steps do not constitute real solutions and are not sufficient, even though they are supported by the existence of free formaldehyde sensors and by various efforts to partially replace the formaldehyde with other less volatile aldehydes, to make use of other condensing agents such as urea, melamine or tannins, and of synthetic resins containing reduced amounts of free formaldehyde, and/or by reduction of the dosages.

With this in mind, mention may, for example, be made of French patent application FR 2 575 754, which combines formaldehyde-based resin and alpha-methylated ketone, or European patent EP 0 043 036, which combines alkyd resins and urea-formaldehyde.

Similarly, besides the use of blood albumin, of sawdust, of various flours, of nutshells, of wheat or of leguminous plants, in particular pea (U.S. Pat. No. 4,942,191), as "extenders", the use of tuber or cereal starches, that can be varied according to the possible conversions or their very nature, is known for this same purpose.

Although their advantage is acknowledged for the bonding of products made of sheets, such as papers or cardboards, their use is less well known in the context of methods for manufacturing panels made of plant materials. It requires considerable adjustments in terms of chemical and/or physical modifications and does not get to the root of, the problem posed by formaldehyde emissions.

Thus, these cereal or tuber starches contribute only secondarily to the desired properties, in particular by making the method easier.

It has been possible to note other approaches, for instance the use of starch or of dextrin in curing mixtures for urea-formaldehyde or melamine-formaldehyde resins (European patent EP 0 183 960) or the use of modified starches from common sources (International patent application WO 87/02929 which describes the use of a starch carbamate, ester or ether).

Mention is also made of French patent FR 2 576 603, which recommends binders comprising, among other compounds, monosaccharides and disaccharides.

These various approaches result in a plurality of formulae, all of which containing at least one formaldehyde-based resin, and allow the harmful effects of the emissions to persist, during the manufacture or the use of the manufactured products. Their presence is always considered to be essential in order to satisfy the change in specifications, and in particular to satisfy the levels, according to standards, of water resistance and moisture resistance.

They also comprise the risk of harming, by virtue of excessive compromises, the properties in particular of water resistance or moisture resistance.

In any event, these proposals generate a deep dissatisfaction, the user also being concerned by the risk of health problems ("sick house syndrome").

In fact, there are many sources of emissions, in particular in the home. The level thereof is high, although variable (from 0.1 to 1.5 parts per million, or ppm). It is essential to act, on those that are due to building or coating materials which use large amounts of adhesive.

Proposals are aimed at completely substituting emission-generating resins with other compounds capable of performing the same functions, in particular with respect to water resistance or moisture resistance.

Attempts have considered the use of derivatives of lignin, of potato pulps, of proteins or of cationic starch, or replacement with polyurethanes or epichlorohydrin-based resins, which also exhibit high toxicity.

It is thus to the applicant's credit to have established that it is entirely possible to remedy this problem of formaldehyde vapor emissions by selecting a novel adhesive composition for producing panels made of plant materials, which, in its make-up, is low in, or even devoid of, formaldehyde-based resin.

The novel adhesive composition according to the invention intended for manufacturing panels made of plant materials, especially lignocellulosic materials, is characterized in that it contains an amount of synthetic resin RS, taken on a dry basis (in particular formaldehyde-based, epichlorohydrin-based or of polyurethane type) and an amount of starch A, comprising at least one legume starch, taken on a dry basis, such that the value defined by the ratio A/(A+RS) is between 50 and 100%, preferably between 60 and 100%, and more preferably between 70 and 100%, and, optionally, at least one compound selected from the group consisting of intrinsically hydrophobic resins, for instance BASOPLAST™ resins (BASF), products referred to as "extenders", curing agents, pigments and fillers, and chemical agents such as, for example, various sulfates or chlorides.

The novel composition according to the invention may also additionally comprise one or more starches originating from other sources, for instance starches from cereals such as maize, wheat or rice, or from tubers such as potato or cassava.

It is accepted that an adhesive composition according to the invention may contain reduced amounts of synthetic resin RS and remain advantageous in accordance, in particular, with the legislation in force, once a situation of compromise requires it.

In general, the term "synthetic resin RS" is intended to mean any formaldehyde-based or formaldehyde-releasing resin, and also any epichlorohydrin-based or polyurethane-type resin.

According to a preferred variant, the novel composition according to the invention intended for manufacturing panels made of plant materials, especially lignocellulosic materials, is characterized in that it contains an amount of synthetic resin RS of less than 40%, preferably less than 30%, and better still less than 25%, an amount of starch A, comprising at least one legume starch, in a proportion of between 60 and 100%, preferably between 70 and 100%, and better still between 75 and 100%, expressed as solids content relative to the entire solids content of the adhesive composition, and, optionally, at least one compound selected from the group consisting of intrinsically hydrophobic resins, products referred to as "extenders", curing agents, pigments and fillers, and chemical agents.

The novel composition according to the invention is particularly advantageously characterized in that it contains an amount of synthetic resin RS of less than 10%, preferably less than 5%, and more preferably less than 1% of the adhesive composition (on a dry/dry basis).

The Applicant has indeed observed, that such a composition constitutes a simple, relatively inexpensive and readily accessible means of succeeding in manufacturing panels made of plant materials with no, or with very few, formaldehyde vapor emissions, in particular during a hot pressing phase.

Consequently, the present invention also relates to a method for manufacturing panels made of plant materials, especially lignocellulosic materials, comprising a step of treating said materials with the adhesive composition according to the invention, and steps of forming and hot pressing.

Thus, the use of the composition according to the invention in said method makes it possible for the formaldehyde vapor emissions, corresponding to measurements carried out in the vicinity of the manufacturing devices, to be less than 0.1 part per million (ppm), preferably less than 0.05 ppm, and more preferably less than 0.01 ppm.

In parallel, the method in accordance with the invention makes it possible to obtain a panel characterized in that it is liable to emit into the atmosphere less than 30 milligrams (mg) of formaldehyde, per 100 grams of said panel, measured according to the "perforated" method, as defined by European standard EN 120 of July 1991.

Better still, under conditions considered to be optimal, the panel obtained is characterized in that it emits into the atmosphere less than 10 mg, measured according to the European standard mentioned, preferably less than 5 mg per 100 grams of said panel.

Such possibilities, that satisfy all the technical, economical, and health conditions, are provided as long as use is made of judiciously, selected and readily accessible starches.

Thus, in the context of the invention, it has been noted, surprisingly and unexpectedly, that legume starches, in particular from pea, may be used in and be suitable for the development of adhesive compositions according to the invention and may make it possible to obtain high-quality panels made of plant materials, even in the absence, or in the presence of very limited amounts, of synthetic resin.

The Applicant attaches most particular importance to starches from leguminous plants, in particular from pea, in which the amylose content is between 30 and 60%, preferably between 30 and 52%.

It has indeed been noted that, surprisingly and unexpectedly, the legume starches, in particular from pea, that corresponds to these characteristics, constitute a very advantageous solution in the context of the invention.

The presence of a significant amount, in the compositions according to the invention, of legume starches, in particular from pea, relative to the total amount of starch, i.e. at least equal to 5%, preferably at least equal to 20%, and more preferably greater than 50%, allows in particular a very substantial reduction in the useful amounts of formaldehyde-based resins, well beyond the current limits, and even the elimination thereof, while at the same time preserving the essential properties of the products manufactured, in particular in terms of water resistance and moisture resistance.

For the purposes of the present invention, the term "legume" is intended to mean more particularly the family Papilionaceae, the most important of which are bean, pea, lentil, broad bean, alfalfa, clover and lupin.

For the purposes of the invention, the expression "legume starch" is intended to mean starches extracted from leguminous plants, in particular pea, that have a high starch content, in particular greater than 90% (on a dry/dry basis), accompanied by a content of colloidal materials and fibrous residues that is generally low, for example less than 1% (on a dry/dry basis).

The starch content is preferably greater than 95%, and more preferably greater than 98% (on a dry/dry basis).

The protein content is preferably less than 1%, preferentially less than 0.5%, and more particularly between 0.1 and 0.35% (on a dry/dry basis).

Legume starches, in particular from pea, are considered to be readily accessible, under good, in particular economical, conditions, compared with the other starch sources.

The preferred adhesive compositions in accordance with the invention are characterized in that they contain at least one legume starch in particular from pea, that has an amylose content of between 30.5 and 45%, preferably between 31 and 40%, and more preferably between 31.5 and 39.5%.

The surprising and unexpected nature lies in particular in the fact that legume starches, in particular from pea, have an amylose content that is often barely higher than those of the conventional cereal and tuber starches, for which this content is of the order of 20 to 28%, and which, in themselves, do not confer as satisfactory a water resistance or moisture resistance.

Furthermore, while the starches from cereals having high contents in amylose, in particular from maize, i.e. having a content of greater than 50%, are advantageous, for corrugated cardboard for example, from this point of view of water resistance this property is not found in the production of panels.

More particularly, the starches having an amylose content of greater than 60%, or even worse greater than 70%, are difficult to use.

Thus, as befits the lack of studies on this point, the Applicant verified that it was not possible, in the case of the use of amylose-rich cereal starches, to do without formaldehyde-based resins, nor even to significantly reduce the amounts thereof.

These amylose-rich starches also require a considerable heat supply in order to solubilize them, an aspect that generates a risk of bonding deficiency.

It can be deduced from the above that it is impossible to establish a link, even distant, between the level of amylose in the legume starches, in particular from pea, and the properties exhibited by the adhesive compositions according to the invention.

The applicant concludes that the very nature of these legume starches generates the high performance levels observed and the ability to greatly reduce, or even eliminate, the formaldehyde-based resins.

It is also possible to combine with the starches, in the compositions according to the invention, various pigments or fillers commonly used in industry.

These materials are used as "filling" agents in order to preserve or support, at low cost, the properties essential to the application.

Kaolins, calcium carbonates, talc, titanium oxide, calcium barium sulfates are, for example, used for these purposes.

These additions are found to be useful, in particular, for blocking pores and, such as kaolin for example, for preventing blistering (gaboon wood).

It is also common to add tannins, preferably condensed tannins such as, for example, pine bark tannins, pecan nut tannins, mimosa tannins and/or quebracho tannins, that are in particular modified.

The compositions according to the invention can also contain water-repellent agents, for instance reactive silicones, plasticizers such as urea or polyols or curing agents such as ammonium salts, and in particular ammonium chloride, ammonium sulfate, ammonium acetate and ammonium lactate.

According to one variant, a composition according to the invention that satisfies the requirements, in particular relating to the criteria of water resistance or moisture resistance, and observing as much as possible the hygiene and public health conditions, for manufacture or for use, is characterized in that, besides the possible absence of any formaldehyde-based resin, it comprises an effective amount of a chemical agent selected from sulfates and chlorides, in particular zinc, alumina, ammonium or copper sulfates and chlorides, zirconium-bearing compounds, or mono- or diammonium phosphate.

Among the preferred chemical agents according to the invention, alumina sulfate is a readily available product. Its use does not, however, ever seem to have been suggested for the specified purposes of improving water resistance or moisture resistance, for the manufacture of panels.

Zinc sulfate may also be preferably used.

Even more specifically, additions of entirely reasonable amounts of one of these judiciously chosen salts and, more particularly, according to a preferred variant of the invention, of zinc sulfate, make it possible to obtain very good water-resistance or moisture-resistance effects, in particular expressed according to the established determining criteria.

The term "effective amount" is here intended to mean an amount of chemical agent at least equal to that which allows said adhesive composition to confer on the manufactured panels the desired good properties of water resistance or moisture resistance, the abovementioned properties being in particular determined according to the usual conventions.

With the use of starches, in particular legume starches, especially from pea, that have an amylose content as defined above, in sufficient and significant amounts, it is noted that a homogeneous adhesive can be very readily constituted from a powder.

It is also possible to readily obtain adhesives having solids contents comparable to those of the usual adhesives, i.e. of the order of 40 to 60%, and having similar behaviors, in particular with respect to pressing.

The texture thereof is referred to as "short", which expression reflects an appropriate Theological behavior, in particular under the best conditions for distribution.

It is, moreover, facilitated by the constancy of the viscosity, independent of the level chosen, of from 400 to 5000 mPa·s, in relation to essential data such as porosity and structure of the wood bonded, or its surface finish.

Besides the ready supply, the cost of the starch and the amounts used permit a cost for obtaining the adhesive that is at most equal to those of the adhesives conventionally used.

The initial bonding before pressing ("tack") is entirely satisfactory and allows good forming and good positioning of the materials intended to be cured and/or assembled.

In addition, in careful examinations, a tendency to blister has never been noted, during all the manipulations undertaken.

When the panels prepared are broken or separated, after having been kept in a controlled and constant atmosphere (between 50 and 65% relative humidity), it is noted that, in all cases, there is defibering, which makes it possible to conclude that the strength of the adhesive joints is at least equal to the cohesion of the fibers.

Finally, the Applicant has noted that it is possible to obtain, according to the formulations envisioned, all the degrees of water resistance or moisture resistance determined by convention, in particular defined by the response of the bondings to the various "classes of stress":

D 1: dry environments (inside furniture, bed base slats, mezzanine floors, or ping-pong tables, for example), D 2: environments not very wet (bathroom furniture or vehicle floors, for example), D 3: environments frequently wet (protective outside weatherboarding or trailer structures, for example), D 4: environments permanently in contact with water: for example, unprotected outside weather-boarding, formwork for concrete.

The Applicant considers, moreover, that, for a composition according to the invention that is completely satisfactory, the use of legume starches in particular from pea, alone or as a mixture, that are not modified, especially chemically, is entirely sufficient.

Modified starches, especially chemically modified starches, may be useful; however, the advantage thereof is not obvious, in particular with regard to their cost.

The justification thereof may lie in an additional improvement in properties during any one of the manufacturing operations or in the adhesive properties in themselves.

There may also be a gain as a result of easier or partial gelatinization, subsequent to a chemical and/or physical modification, in particular in terms of bonding rate or bonding quality, of strength or of heat balance.

It is thus entirely possible to use pea starches that are partially oxidized or hydrolyzed by means of acid or enzymatically.

Other modifications are possible, such as physical modifications, for instance known thermal operations, of pregelatinization, of extrusion, of hot moisture treatment or of annealing.

In particular, pregelatinization, extrusion or any other operation, in particular chemical operation, that results in partial or total solubility of the starch, is motivated by the search for better properties, in particular rheological and distribution/placement properties, of the composition according to the invention.

These considerations may also lead those skilled in the art to envision combining granular starch and partially or totally soluble starch, in any proportions.

It is thus shown that a legume starch, in particular from pea, for the purpose of the invention, with favorable cost, supply and regulation aspects, constitutes a simple and ready means for obtaining adhesive compositions according to the invention that exhibit all the desirable variations in performance levels suitable for the technical requirements.

The various aspects of the present invention, relating to the formulation and the development of normal adhesive compositions, will be described in greater detail by means of the following examples, which are in no way limiting.

EXAMPLE 1

Prior Art

It provides two examples of formulations with flours, that are extreme in terms of "extension":

|  | Formula 1.1 | Formula 1.2 |
| --- | --- | --- |
| Urea-formaldehyde (solids content = 65%) | 80 parts | 38.5 parts |
| Wheat flour | none | 38.5 parts |
| Fine sawdust and cocoa flour | 8 parts | none |
| Water | 4 parts | 19 parts |
| Ammonium chloride | 8 parts | 3.8 parts |
| Solids content of the adhesive | 68% | 63% |
| Relative cost | 1 (base) | 0.75 |

EXAMPLE 2

Invention

A composition (formula 2.1) according to the invention is designed based on potato flour and pea starch, 99% rich and with a 36.7% amylose content, in order to reduce the formaldehyde-based resin:

|  | Formula 2.1 |
| --- | --- |
| Water | 47.7 parts |
| Dexylose ® H235 (pregelatinized waxy corn starch, soluble - 94% solids content) | 9.5 parts |
| Potato flour (granular - 82% solids content) | 28.6 parts |
| Pea starch (88% solids content) | 3.2 parts |
| Alumina sulfate | 1.7 part |
| Kaolin | 1.7 part |
| Water-repellent agent | 2.4 parts |
| Kaurit ® 285 resin (urea-formol with a 67% solids content - from BASF) | 5.1 parts |
| Ammonium chloride | 0.1 part |
| A/A + RS ratio | 91.1% |

When using formula 2.1, a substantial reduction in the feeling of irritation is observed close to the manufacturing tables, in particular compared with that felt with compositions of the prior art (example 1), for a very similar water resistance.

Formula 2.1 is compared with two other formulae 2.2 and 2.3, below, in accordance with the invention, themselves also containing a pea starch in different proportions.

Said pea starch is 99% rich and has an amylose content of 36.7%.

|  | Formula 2.2 | Formula 2.3 |
|---|---|---|
| Water | 44 parts | 44.5 parts |
| Pregelatinized starch (94% solids content) | 13.2 parts | 9.9 parts |
| Pea starch (granular, containing 36.7% of amylose - 88% solids content) | 22 parts | 13.5 parts |
| Wheat flour (granular - 86% solids content) | 11 parts | none |
| Potato flour (granular - 82% solids content) | none | 24.6 parts |
| Kaolin | 2.3 parts | 3.4 parts |
| Urea | 0.4 parts | none |
| Ammonium chloride | 0.1 part | 0.2 part |
| Reactive silicone | 0.4 part | none |
| Melamine-formol resin Madurit MW114 (35% solids content) | 6.6 parts | none |
| Urea-formol resin Kaurit 285 (67% solids content) | none | 4.9 parts |

Compositions 2.2 and 2.3 according to the invention are also defined by the characteristics of the adhesives:

|  | Formula 2.2 | Formula 2.3 |
|---|---|---|
| Solids content | 48% | 47% |
| Brookfield viscosity | 3000 mPa.s | 3000 mPa.s |
| Shelf life | 48 hours | 48 hours |
| Relative cost | 1 (base) | 0.775 |
| A/A + RS ratio | 94.7% | 92.6% |

While the three formulae provide a very substantial reduction in the amounts of melamine-formaldehyde or urea-formaldehyde resins, the last two are more preferred for their viscosity, shelf life and cost.

EXAMPLE 3

A procedure for preparing small panels, using formulae 2.2 and 2.3, is used in the laboratory, which procedure has two steps:

sizing by spreading 2 and 3 grams of the adhesive tested over a surface area of 100 cm² of gaboon wood, spruce wood or poplar wood (10 cm×10 cm×1.5 cm) conditioned beforehand (20° C.-65% RH), simultaneously heating (surface temperature: 180° C.) and pressing (7 bar/cm²). The water resistance is judged by means of an immersion test, in which the test samples are immersed under a load of 100 grams.

The tendency to blister is estimated by means of grading ranging from 0 (poor) to 5 (good).

The quality of the bonding is assessed by measuring the tensile strength of the adhesive joint on an Instron 1122 machine.

The water resistance is good (formula 2.2), or even excellent (formula 2.3), according to classes D 1 and D 2, in the context of a complete lack of blistering and very good dry bonding.

EXAMPLE 4

A formula 4.1 is prepared according to the invention:

| Water | | 60 |
|---|---|---|
| Dexylose ® H235 (waxy soluble starch) | | 12 |
| Potato flour | | 30 |
| Pea starch (granular, containing 36.7% amylose) | | 13.5 |
| Kaolin | | 2 |
| Alumina sulfate (18 H₂O) | | 2 |
| Reactive silicone | | 3 |
| Proxel GXL (ICI) | | 0.9 |
| Brookfield viscosity at | T = 0 | 7500 cp |
|  | T = 1 hour | 7700 cp |
|  | T = 24 hours | 7800 cp |
| Water resistance | | defibering at 24 h |
| A/A + RS ratio | | 100% |

The characteristics of the panel obtained, under the conditions defined in example 3, with formula 4.1 according to the invention, are compared with those obtained, under the same conditions, with a formula 4.2 of the prior art, for example, which is similar to formula 1.1 of example 1:

|  | Formula 4.2 | Formula 4.1 |
|---|---|---|
| Flexural strength (N/mm²) | 140 | 120 |
| Strength modulus (N/mm²) | 11 000 | 10 000 |
| Water content | 5.5% | 6% |
| Tendency to blister | 4 | 5 |
| Perforator measurement (European standard EN 120) | 1.8 mg/100 g | 0.05 mg/100 g |

The advantage of this formulation 4.1 is demonstrated: it makes it possible to obtain an extremely low level of formaldehyde vapor emission, due to materials constituting the panel, which are recycled, for entirely suitable mechanical characteristics.

The invention claimed is:

1. A wood panel, comprising plant materials and an adhesive composition, wherein,
said plant materials are treated with the adhesive composition containing:
an amount of synthetic resin RS, selected from the group consisting of formaldehyde-based, epichlorohydrin-based and polyurethane type that is less than 25%, expressed in terms of dry resin relative to the entire solids content of the adhesive composition, and
an amount of starch A, comprising at least one legume starch, that is between 70 and 100%, expressed in terms of dry starch relative to the entire solids content of the adhesive composition,
an amount of legume starch such that the proportion of legume starch, relative to the total amount of starch A, is at least equal to 20%, and
wherein the value defined by the ratio A/(A+RS) is between 70 and 100%.

2. The panel as claimed in claim 1, wherein said panel is liable to emit into the atmosphere less than 30 milligrams (mg) of formaldehyde, per 100 grams of said panel, measured according to the method defined by the European standard EN 120 of July 1991.

3. The panel as claimed in claim 1 wherein said panel is liable to emit into the atmosphere less than 10 milligrams (mg) of formaldehyde, measured according to the European standard EN 120, per 100 grams of said panel.

4. The panel as claimed in claim 1, wherein said panel is liable to emit into the atmosphere less than 5 mg of formaldehyde, measured according to the European standard EN 120, per 100 grams of said panel.

5. The panel as claimed in claim 1, wherein said panels are selected from the group consisting of plywood panels, "sandwich" panels, panels of lamellae (OSB), and "laminated wood".

6. A method for manufacturing wood panels made of plant materials, comprising:
 a) a step of treating said plant materials with an adhesive composition, wherein said composition contains:
  an amount of synthetic resin RS selected from the group consisting of formaldehyde-based, epichlorohydrin-based and polyurethane type, that is less than 25%, expressed in terms of dry resin relative to the entire solids content of the adhesive composition,
  an amount of starch A, comprising at least one legume starch, that is between 70 and 100%, expressed in terms of dry starch relative to the entire solids content of the adhesive composition,
  an amount of legume starch such that the proportion of legume starch, relative to the total amount of starch A, is at least equal to 20%, and
  wherein the value defined by the ratio A/(A+RS) is between 70 and 100%; and
 b) a step of forming and hot pressing the resulting treated plant materials.

7. The method as claimed in claim 6 wherein said composition contains an amount of synthetic resin, expressed on a dry/dry basis, of less than 10%.

8. The method as claimed in claim 6, wherein said composition contains an amount of synthetic resin, expressed on a dry/dry basis, of less than 5%.

9. The method as claimed in claim 6, wherein the proportion of legume starch, relative to the total amount of starch A, is greater than 50%.

10. The method as claimed in claim 6 wherein said legume starch has an amylose content of between 30 and 60%.

11. The method as claimed in claim 6, wherein said legume starch has an amylose content of between 30.5 and 45%.

12. The method as claimed in claim 6, wherein said legume starch has an amylose content of between 31 and 40%.

13. The method as claimed in claim 6, wherein said composition comprises an effective amount of a chemical agent selected from the group consisting of sulfates, chlorides, zirconium-bearing compounds, and diammonium phosphate.

14. The method as claimed in claim 6, wherein said amount of starch corresponds to a mixture of at least one starch in the granular state, that is optionally modified, and at least one starch with partial or total aqueous solubility, that is optionally modified.

15. The method as claimed in claim 6, wherein the wood panels are selected from the group consisting of plywood panels, "sandwich" panels, panels of lamellae (OSB), and "laminated wood".

16. The method of claim 6, wherein the legume starch has a starch content greater than 90% on a dry/dry basis and a content of colloidal materials and fibrous residues less than 1% on a dry/dry basis.

17. The method of claim 6, wherein the legume starch has a starch content greater than 95% on a dry/dry basis.

18. The method of claim 6, wherein the legume starch has a starch content greater than 98% on a dry/dry basis.

19. The method of claim 6, wherein the legume starch has a protein content less than 1% on a dry/dry basis.

20. The method of claim 6, wherein the legume starch has a protein content less than 0.5% on a dry/dry basis.

21. The method of claim 6, wherein the adhesive composition has a solid content of 40 to 60%.

* * * * *

UNITED STATES PATENT AND TRADEMARK OFFICE
CERTIFICATE OF CORRECTION

PATENT NO.       : 8,394,874 B2                                              Page 1 of 1
APPLICATION NO.  : 10/543258
DATED            : March 12, 2013
INVENTOR(S)      : Graux et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1238 days.

Signed and Sealed this
First Day of September, 2015

Michelle K. Lee
*Director of the United States Patent and Trademark Office*